UNITED STATES PATENT OFFICE.

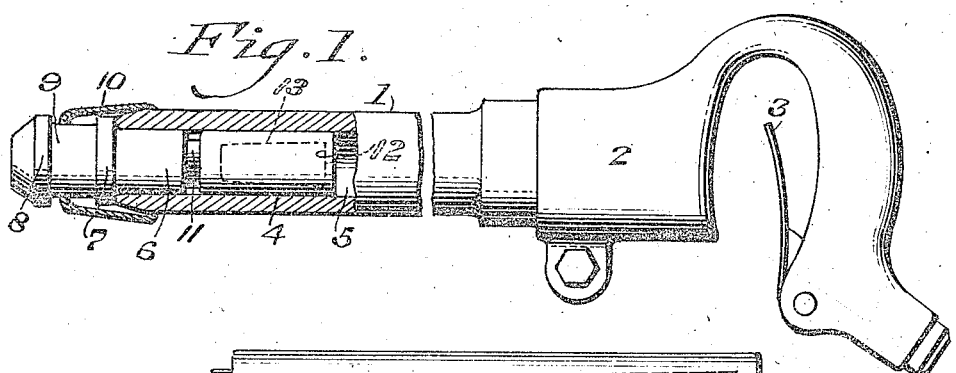
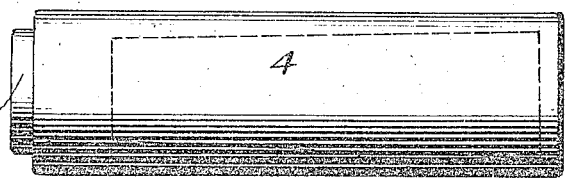
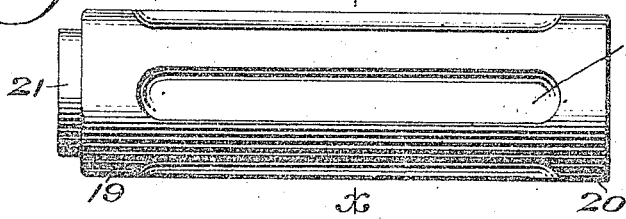
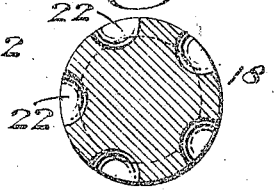
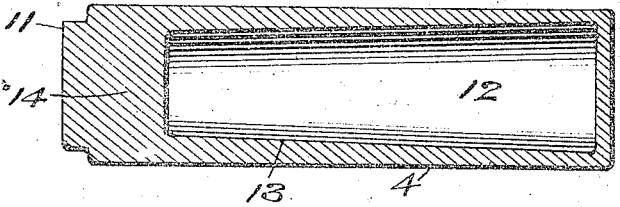
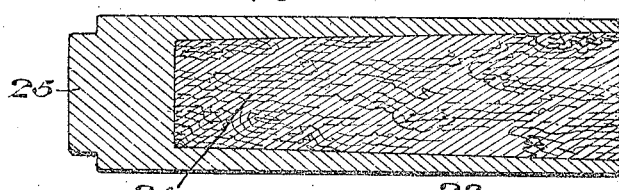
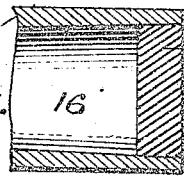

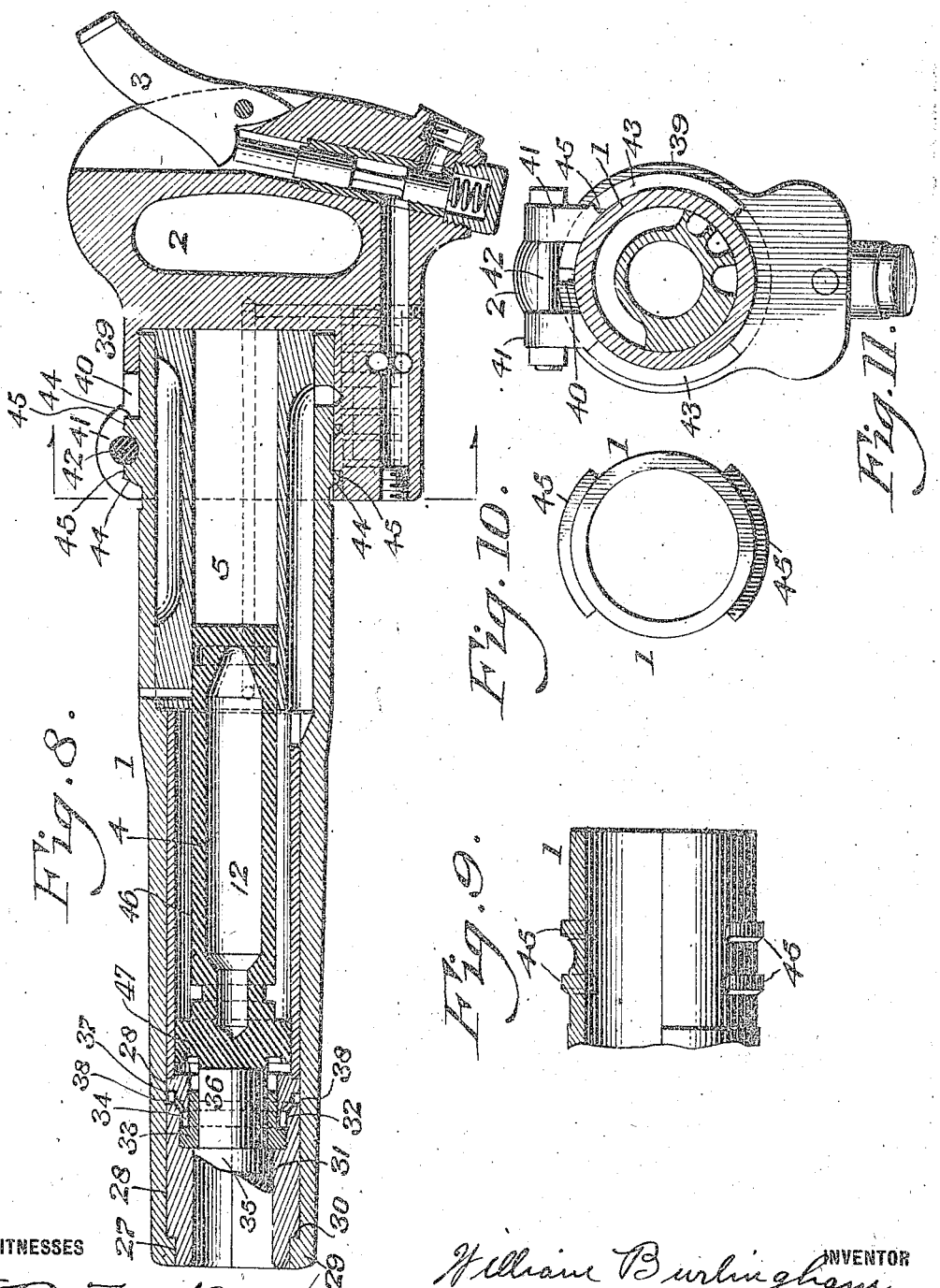

WILLIAM BURLINGHAM, OF NEWPORT NEWS, VIRGINIA, ASSIGNOR, BY DIRECT AND MESNE ASSIGNMENTS, TO ENGINEERING PRODUCTS CORPORATION, OF NEWPORT NEWS, VIRGINIA, A CORPORATION OF VIRGINIA.

PNEUMATIC-TOOL PISTON.

1,167,975.     Specification of Letters Patent.     Patented Jan. 11, 1916.

Application filed May 21, 1914. Serial No. 840,025.

*To all whom it may concern:*

Be it known that I, WILLIAM BURLINGHAM, a citizen of the United States, residing at Newport News, county of Warwick, State of Virginia, have invented a new and useful Pneumatic-Tool Piston, of which the following is a specification.

In pneumatic tools of the reciprocating type wherein the hammering piston impacts directly on the shank of the working tool, as heretofore manufactured, it has been generally deemed necessary to construct the piston solid or of considerable weight in order that a sufficient amount of energy will be imparted to the shank of the chisel, rivet set or other working tool against which the piston impacts. Such hammering piston therefor has generally heretofore been constructed of a solid piece of metal.

As a result of numerous experiments, I have found that the weight of the piston has very little to do with the energy of the blow at the point of impact, but it has a great deal to do with the rapidity of the stroke and that if a hollow or chambered piston is employed a much higher speed of the piston of the same dimensions as a solid piston is attained with about the same energy of the blow which is due to the fluid pressure behind the piston more than to the impetus of weight.

With the above ends in view, my invention consists in its broad and generic scope, of a novel pneumatic tool piston adapted to impact upon the shank of the working tool and having a recess or chamber therein, said piston being guided in the piston chamber or bore of the pneumatic tool cylinder, the outer periphery of the piston forming a bearing surface of sufficient length to prevent injury to the bore or cylinder of the pneumatic tool.

It further consists of a novel construction of a pneumatic tool piston having a recess or chamber therein and provided at its forward end with a solid portion or striker adapted to impact against the shank of the working tool.

It further consists of a device for cushioning the rebound of the working tool in the lower end of the barrel.

It further consists of a device for securing the handle to the barrel.

Other novel features of advantage and construction will more clearly hereinafter appear in the detailed description.

For the purpose of illustrating my invention, I have shown in the accompanying drawing one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation, partly in section, of a pneumatic tool having the piston embodying my invention employed in conjunction therewith. Fig. 2 represents a side elevation of my novel piston. Fig. 3 represents a sectional elevation thereof. Fig. 4 represents a sectional elevation of another embodiment of my invention, wherein a removable closure is employed. Fig. 5 represents a side elevation of another embodiment of my invention. Fig. 6 represents a section on line $x$—$x$ Fig. 5. Fig. 7 represents another embodiment of my invention. Fig. 8 represents an axial section of a hammer provided with my improved cushioning device and handle fastening. Fig. 9 represents a detail side view partly in section, of the upper end of the barrel. Fig. 10 represents an end view of the same. Fig. 11 represents an end view of the handle socket.

Similar numerals of reference indicate corresponding parts in the figures.

Referring to the drawings a pneumatic tool of any desired or conventional type, and as ordinarily constructed, comprises a cylinder 1, to which is connected a suitable handle 2, provided with a lever 3, which is adapted to be manually operated to control the admission of motive fluid to the valve mechanism, which in turn controls the movement of the hammering piston 4, which reciprocates within the bore or piston chamber 5 and imparts its blow to the shank of the working tool 6 such as, for example, a chisel or the rivet set illustrated. The end of the rivet set extends into the end of the bore 5 in the path of the reciprocating piston 4 and such working tool 6 may be provided with the shoulders 7 and 8 thereby forming a groove 9 with which coöperates the clip 10 which prevents the accidental removal of the working tool from the cylinder 1.

The reciprocating piston 4, if desired, may be provided with a solid reduced diameter portion at its forward end thereby forming an impact portion, striker or head 11, although as will be apparent, in the broad and basic principle of my invention, the piston may consist of a cylindrical bolt or plunger of uniform diameter throughout its length. The piston 4 is provided with an internal recess or chamber 12 which may have any desired formation and which may be constructed therein in any desired manner. For purposes of illustration, I have preferred to show the walls 13 as converging toward the forward end and this chamber 12 terminates a desired distance from the forward end of the piston so that the striker or solid portion 14 is provided in rear of the forward striking face of the piston. The piston may be formed with the chamber 12 therein or, if desired, it may be constructed as seen in Fig. 4, from which it will be seen that the piston 15 is provided with a recess 16 which opens through the rear end of the piston and such open end has secured therein, in any desired manner, a closure or plug 17 which is fixed therein and this plug may have a driving fit or be welded or riveted with respect to the wall of the piston 15 according to requirements. The piston, however, is preferably forged in such a manner that it is tight without the necessity of employing any plug in the end thereof, substantially as seen in Fig. 3.

I have found in actual practice that the velocity of my novel hammering piston is increased twenty per cent., when it is lightened in the manner I have disclosed by chambering it or removing a portion of its internal mass and the blow of the lighter piston of my novel construction is heavier and more effective than the blow of a heavier piston of the same external dimensions.

I have found that by decreasing the weight of the standard piston from 15½ ounces to 13½ ounces that the strokes were increased in number from 996 per minute to 1200 per minute and while there was a loss in energy due to the lighter piston of 405 foot pounds per minute under the normal speed of the heavy piston, there was gained 7245 foot pounds per minute due to the increased rapidity of the stroke owing to the reduction of weight of the piston.

I have deemed it unnecessary to show or describe in detail the construction of the valve mechanism or the arrangement of the co-acting ports and passages common to the valve mechanism, cylinder and piston, since my invention is capable of use with any desired type of metal or stone-working pneumatic tool wherein the hammering piston is employed. When my invention is applied to a pneumatic riveter the length of the stroke of the piston may be greater or less than the length of the piston, Fig. 1 in the present instance being designed to show the stroke of the piston as greater than the length thereof.

I have also deemed it unnecessary to show or describe in greater detail the various constructions of working tool which may be employed in conjunction with my invention, as the same is capable of impacting upon a rivet set, chisel for chipping metal or other desired form of tool for stone working and the like.

It is very essential in cases of riveting to which my invention is particularly adapted that the stroke of the reciprocating piston be of sufficient rapidity and sufficient energy so as to effect the heading of the red hot rivet in as short a period or as few seconds as possible, since in order to obtain the best results the rivet should be headed immediately while in a red hot condition, as is well known to those skilled in the art. I have found that my novel construction of piston is particularly adapted and can be most efficiently used in connection with riveting hammers where it is desired to effect the operation of riveting in as few seconds as possible, and my invention will be found to be equally efficient in all other classes of work wherein it is desired to attain the greatest possible efficiency from the reciprocations of the hammering piston.

In Fig. 5, I have shown another type of piston 18 embodying my invention, wherein I provide the cylindrical end portions 19 and 20 and the striker 21, the piston, however, being grooved or fluted longitudinally by means of a series of longitudinal depressions 22, as will be understood from Figs. 5 and 6.

In Fig. 7 I have shown another form of piston 23, embodying my invention, the same having the chamber 24 therein and the striker 25, the end 26 thereof being open, and, if desired, the chamber 24 may be filled with aluminum, as indicated at 27, or other similar light and durable material. It will of course be understood that the piston seen in Figs. 3 and 4 may be filled with aluminum to the extent desired, whereby the weight of the piston can be regulated according to the amount of aluminum or other material carried within the interior thereof.

In the employment of the construction seen in Figs. 5 and 6, it will be apparent that the piston is lightened exteriorly, and, in addition, there is a reduction of the surface exposed to friction.

In Fig. 8 of the drawings is illustrated a device for cushioning the recoil of the working tool. The barrel has a longitudinal bore, 28, having an inwardly projecting annular flange, 29, at its lower end, forming a shoulder against which an annular shoulder, 30, at the lower end of a tool-bushing, 31, bears. The bore of said bushing has an annular chamber or recess, 32, near its upper end and an annular piston-flange, 33, upon a sleeve, 34, has a sliding fit in said recess and the sleeve has a sliding fit in the upper end of the bore of the bushing. The shank, 35, of the working tool fits in the bore of the socket and has its upper end, 36, reduced to fit into the bore of the sliding sleeve and to form a shoulder bearing against the lower end of the sleeve. The shank is longer than the sleeve, so that the upper end of the same will project to be struck by the end of the piston when the latter is reciprocated.

When the piston strikes the shank of the working tool, it will move the same downward, and will carry the sleeve downward, with air entering the annular recess and forming an air-cushion between the upper face of the same and the piston-flange of the sleeve, and when the tool rebounds after the blow, it will move the sleeve upward against such air-cushion, whereby the shock from the rebounding tool is absorbed by the cushion. For the purpose of insuring the air-cushion in the tool-socket, the latter has preferably a peripheral groove, 37, at its upper end, from which inclined bores, 38, extend into the recess, and the socket is preferably formed from two longitudinal halves to permit of the flanged sleeve being inserted into it and the socket then inserted into the barrel from above, the two halves being held together by the lower end of the barrel. In said Fig. 8, the plunger is disclosed as formed with a smaller diameter, long piston portion, 46, and a large diameter piston, 47, and with an axial cavity, 12, like the other plunger illustrated.

The handle socket, 39, has a longitudinal open slot, 40, in one side, and perforated ears, 41, through which a clamping screw, 42, can be inserted to draw the socket tightly upon the barrel, and the interior of the socket has two diametrically-opposite recesses, 43, and two pairs of annular grooves, 44, intersected by said recesses. The upper end of the barrel has two pairs of peripheral thread-sections or flanges, 45, which can be slid into the recesses in the socket, whereupon, on turning the barrel or handle, one in relation to the other, said threads or flanges can slide into said grooves, locking the barrel and handle together, and by tightening the clamping screw, the socket will be clamped against turning upon the barrel.

It will now be apparent that I have devised a novel and useful construction of a pneumatic tool piston, which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars, without departing from the spirit or scope of the invention or sacrificing any of its advantages.

Having thus described my invention what I claim as new and desire to secure by Letters Patent, is:—

1. The combination of a pneumatic tool cylinder, a hollow piston having a closed chamber therein, and a working tool upon the shank of which the blows of the piston are imparted.

2. A pneumatic tool piston of the impact type having a completely and tightly closed chamber therein.

3. A pneumatic tool piston of the impact type having a longitudinally extending completely and tightly closed chamber therein.

4. A pneumatic tool piston of the impact type having a longitudinally extending closed chamber therein and its forward striking-end solid and of reduced diameter.

5. A pneumatic tool piston having a forward striking end, and provided with a chamber extending through its rear end, and a plug closing the end of said chamber.

6. A pneumatic tool piston having a longitudinally extending closed chamber therein, the walls of which converge toward the forward end of the piston, said end being made solid and of greater thickness than the walls of the piston.

7. A pneumatic tool piston, having a cylindrical portion adapted to have a sliding fit in the tool-cylinder and having a portion of its body removed from the interior thereof to reduce its weight, whereby a completely and tightly closed chamber is formed within the piston.

8. A pneumatic tool piston, having cylindrical portions at its ends adapted to have a sliding fit in the tool cylinder, and having a portion of its bulk removed from the interior thereof to reduce its weight, whereby a completely and tightly closed chamber is formed within the piston.

9. The combination of a pneumatic tool cylinder, a piston of the impact type having a completely and tightly closed chamber therein, and means for admitting and exhausting compressed motive fluid from an end of said cylinder.

10. The combination of a pneumatic tool cylinder, a piston of the impact type having a closed chamber therein, a working tool upon the shank of which the blows of said piston are imparted, and means for admitting and exhausting compressed motive fluid from opposite ends of said cylinder.

11. As an improved article of manufacture, a differential pneumatic tool piston of the impact type having a completely and tightly closed chamber therein.

WILLIAM BURLINGHAM.

Witnesses:
E. HAYWARD FAIRBANKS,
WM. SECUER.